(12) United States Patent
Lowenstein

(10) Patent No.: US 9,770,673 B2
(45) Date of Patent: Sep. 26, 2017

(54) APPARATUS FOR DIFFUSION-GAP THERMAL DESALINATION

(75) Inventor: Andrew Lowenstein, Hopewell, NJ (US)

(73) Assignee: AIL RESEARCH INC., Hopewell, NJ (US)

( * ) Notice: Subject to any disclaimer, the term of this patent is extended or adjusted under 35 U.S.C. 154(b) by 711 days.

(21) Appl. No.: 14/125,062

(22) PCT Filed: Jun. 8, 2012

(86) PCT No.: PCT/US2012/041677
§ 371 (c)(1),
(2), (4) Date: Mar. 4, 2014

(87) PCT Pub. No.: WO2012/170900
PCT Pub. Date: Dec. 13, 2012

(65) Prior Publication Data
US 2014/0305789 A1   Oct. 16, 2014

Related U.S. Application Data

(60) Provisional application No. 61/494,691, filed on Jun. 8, 2011.

(51) Int. Cl.
*B01D 3/00*     (2006.01)
*C02F 1/08*     (2006.01)
(Continued)

(52) U.S. Cl.
CPC ............... *B01D 3/007* (2013.01); *B01D 1/08* (2013.01); *B01D 1/221* (2013.01); *B01D 5/006* (2013.01); *B01D 5/0015* (2013.01); *C02F 1/08* (2013.01)

(58) Field of Classification Search
CPC ...... B01D 1/08; B01D 3/0073; B01D 5/0015; B01D 5/006; C02F 1/08
See application file for complete search history.

(56) References Cited

U.S. PATENT DOCUMENTS 2,896,428 A   7/1959   Paton et al.
3,801,284 A   4/1974   Meckler
(Continued)

OTHER PUBLICATIONS

International Search Report of PCT/US2012/041677 dated Aug. 28, 2012.
(Continued)

*Primary Examiner* — Jonathan Miller
(74) *Attorney, Agent, or Firm* — Amster, Rothstein & Ebenstein LLP

(57) ABSTRACT

A thermal distillation apparatus including evaporation surfaces that are wetted with a solution, and from which at least some of the volatile solvent contained in the solution evaporates, condensers having an external surface in close proximity to, but not touching, a corresponding one of the one or more evaporation surfaces, and on which vapors of the solvent condense, releasing thermal energy that heats a flow of the solution moving upward within the condensers, spacers that prevent contact between the evaporating surfaces and the condensers, wherein spaces between the evaporating surfaces and the condensers are filled with a gaseous mixture composed of solvent vapor and one or more non-condensable gases, and except for diffusion of the solvent vapor relative to the non-condensable gases, the gaseous mixture is stationary.

29 Claims, 12 Drawing Sheets

(51) Int. Cl.
*B01D 1/08* (2006.01)
*B01D 1/22* (2006.01)
*B01D 5/00* (2006.01)

(56) References Cited

U.S. PATENT DOCUMENTS

| | | | |
|---|---|---|---|
| 4,545,862 A | 10/1985 | Gore et al. | |
| 4,585,523 A * | 4/1986 | Giddings | B01D 1/22 159/13.1 |
| 4,671,856 A * | 6/1987 | Sears | B01D 1/221 159/24.2 |
| 4,680,090 A | 7/1987 | Lew | |
| 4,769,113 A * | 9/1988 | Sears | B01D 1/221 159/24.2 |
| 5,655,598 A | 8/1997 | Garriss et al. | |
| 6,309,513 B1 | 10/2001 | Sephton | |
| 7,166,188 B2 * | 1/2007 | Kedem | B01D 1/228 159/48.2 |
| 7,251,944 B2 * | 8/2007 | Holtzapple | B01D 1/0058 62/333 |
| 8,858,758 B2 * | 10/2014 | Zebuhr | B01D 1/225 159/49 |
| 8,986,509 B2 * | 3/2015 | Batty | B01D 1/0082 203/26 |
| 9,005,404 B2 * | 4/2015 | Batty | B01D 1/0082 203/26 |
| 2006/0113179 A1 | 6/2006 | Hausmann | |
| 2007/0100206 A1 | 5/2007 | Lin et al. | |
| 2009/0145737 A1 | 6/2009 | Kamen et al. | |
| 2011/0108406 A1 | 5/2011 | Maisotsenko et al. | |

OTHER PUBLICATIONS

Written Opinion of International Application PCT/US2012/041677 dated Aug. 28, 2012.

* cited by examiner

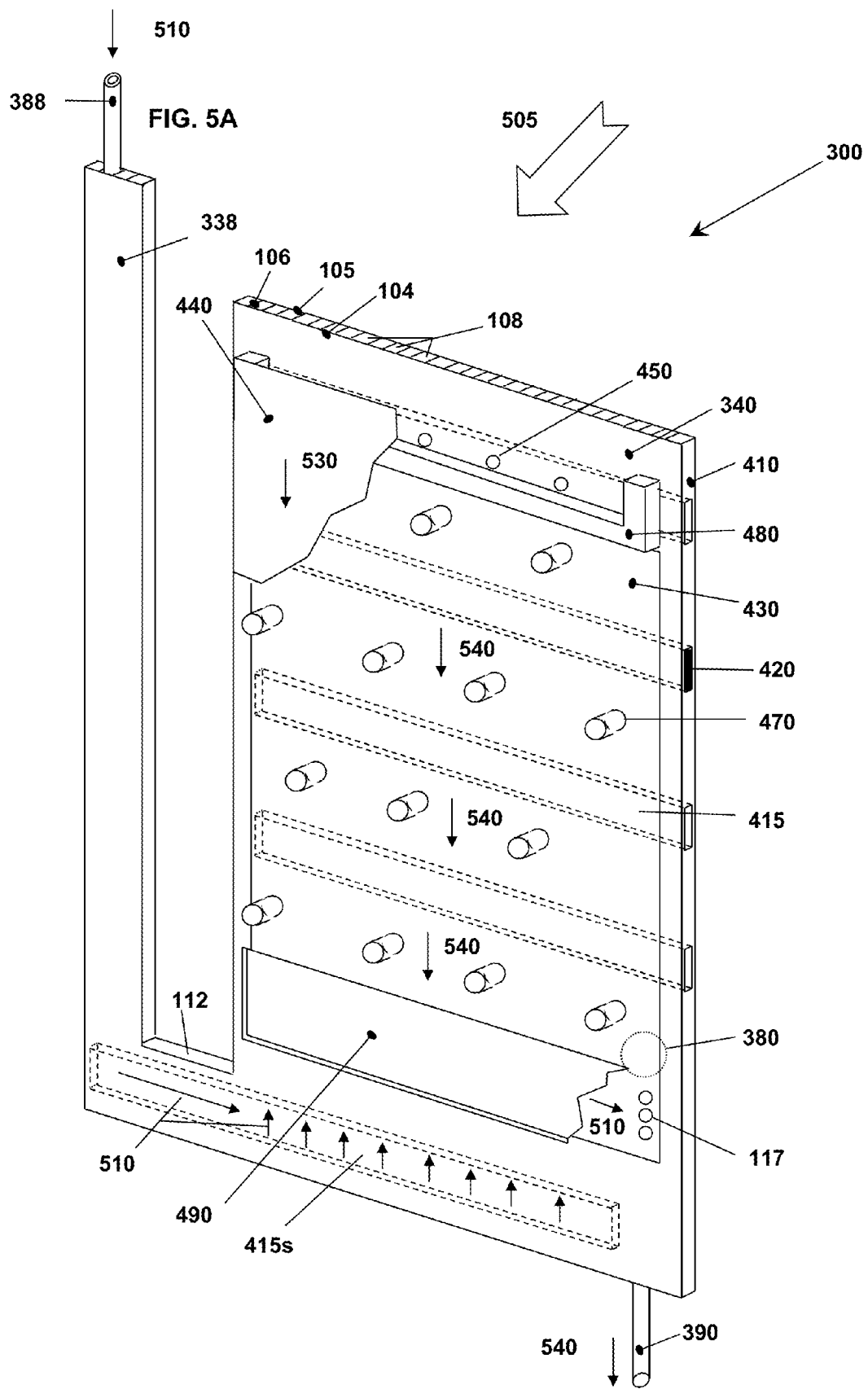

APPARATUS FOR DIFFUSION-GAP THERMAL DESALINATION

GOVERNMENT INTEREST

This invention was made with Government support under Grant No. DE-FG02-06ER84525 awarded by the Department of Energy. The Government has certain rights in this invention.

RELATED APPLICATIONS

This application is a U.S. National Phase of PCT/US2012/041677 which is based on U.S. Provisional Application Ser. No. 61/494,691, filed Jun. 8, 2011, and is now expired, the contents of which are incorporated herein by reference in their entirety.

FIELD OF THE INVENTION

This invention relates to thermal desalination, and in particular to thermal desalination apparatuses and methods in which a space is maintained between condensers and evaporators.

BACKGROUND OF THE INVENTION

Adequate and secure supplies of water are essential for worldwide economic development. When natural sources of fresh water are inadequate to meet local needs, desalination plants frequently are built. Global Water Intelligence (GWI) estimates that between 2009 and 2015, 11 billion gallons per day of water will be provided by new desalination plants. Most of this new capacity will use either reverse osmosis (RO) or some form of thermal distillation: GWI estimates that approximately 70% of new capacity will be RO and the balance, thermal distillation.

Most of the new thermal desalination capacity will use multi-stage flash (MSF) evaporation. As its name implies, a MSF process involves the flashing of brine (which typically is either seawater or brackish water containing dissolved salts) to vapor in multiple chambers that have been cleared of air and other non-condensable gases. The water vapor produced by the flashing condenses on the outer surface of heat exchangers (i.e, condensers). The heat released by this condensation is transferred to the feed stream of brine that flows within the heat exchanger. The condensed water is collected as the product.

In order to maximize the amount of heat delivered to the feed stream by condensing vapor, which improves the efficiency of the process, the brine flashes in a series of chambers each at a slightly lower pressure than the preceding one. The feed stream of brine, which initially may be at 30° C., can be heated to over 90° C. as it flows within the condensers in a direction counter to the flow of flashing brine, (i.e., the feed stream of brine flows into chambers of increasing temperature and pressure). Following this preheating, the feed stream of brine is heated by an external source of thermal energy to its maximum temperature before it flows into the succession of flashing chambers.

MSF desalination plants are highly engineered processing facilities that are best suited to applications needing more than a million gallons per day of water. In smaller facilities, desalination can be done with thermal distillation processes commonly referred to as "humidification-dehumidification" (HD) and "membrane distillation" (MD). HD and MD processes both avoid the large partially evacuated chambers and large metallic heat exchangers used in MSF processes.

The configuration of the MD process shown in FIG. 1 is described in U.S. Pat. No. 4,545,862 to Gore, et al In this configuration, a hot stream of brine 20 flows on one side of a membrane film or thin, microporous, hydrophobic film (which will collectively be referred to as a "microporous membrane") 25 and a cool, condensing surface 30 is maintained on the other side. The temperature difference between the hot brine 20 and the cooler condensing surface 30 induces a diffusion of water vapor from the brine, through the air in the pores of the membrane 25, to the condensing surface 30 where the water vapor condenses as product distillate 35. Heat is released as the water vapor condenses. By flowing the brine feed 40 to the process, which initially is at a low temperature, on the side of the condensing surface 30 opposite to the product distillate 35, the released heat can be used to preheat the brine feed 40. The brine feed that is preheated by the heat of condensation must be further heated by an external heat source before it is delivered to the side of the microporous membrane opposite the product distillate.

For the MD shown in FIG. 1, both the hot brine 20 and the product distillate 35 are in contact with the microporous membrane 25. Because of this feature, the MD process shown in FIG. 1 is commonly referred to as "direct contact membrane distillation" (DCMD).

The performance of all DCMD processes is degraded by the conduction of thermal energy from the hot brine, through the membrane, to the cooled condensing surface. This thermal conduction cools the hot brine without producing condensate.

As explained in PCT Application Publication No. WO 00/72947 A1 to Hanemaaijer and Van Heuvelen, others have suggested modifying a DCMD process so that there is an air gap between the microporous membrane and the product distillate. This air gap reduces both the parasitic conductive flow of thermal energy and the desired, diffusive flow of water vapor from the hot brine to the condensing surface. However, the net effect is to make the conductive flow of thermal energy a smaller fraction of the total energy flow to the condenser, which improves the efficiency of the process. MD processes with an air gap between the membrane and the product distillate are referred to as "air gap membrane distillation" (AGMD).

The brine feed to a desalination plant will contain dissolved gases that have been absorbed from the atmosphere. These gases will come out of solution as the brine feed is heated towards it maximum temperature. As part of their work on MD processes applied to desalination, Jansen, et al., report that the efficiency of producing water can be increased by degassing the feed brine prior to its entry to the plant (Jansen, A., Hanemaaijer, J. H., Assink, J. W., van Sonsbeek, E., Dotremont, C., and van Medevoort, J., "Pilot Plants Prove Feasibility of a New Desalination Technique," Asian Water, March 2010).

The cost of produced water from a desalination system that uses an MD process will be adversely affected by (1) the cost for the membrane, (2) the resistance of the membrane to the diffusion of water vapor, and (3) increased maintenance caused by the scaling or fouling of the membrane. "Humidification-dehumidification" (HD) processes have been explored as a lower cost option for desalination. HD processes share several important attractive features with MD processes: (1) they do not require vacuum vessels, and (2) they do not require expensive, corrosion-resistant, metallic heat exchangers.

As shown in FIG. 2, an HD process can operate similarly to MSF and MD processes in that the heat released during condensation is used to preheat the feed stream of brine. The HD process shown in FIG. 2 is representative of an experimental unit operated by Farid and described in FIG. 1.2 of a review paper for HD technology (Al-Hallaj, S. and Selman, J. R., "A Comprehensive Study of Solar Desalination with Humidification-Dehumidification Cycle", MEDRC Project Report 98-BS-032b, April 2002). In FIG. 2, hot brine 110 is delivered to a humidification section 120 composed of a porous bed of contact media 122. The brine flows downward wetting the surface of the contact media 122 while air 130 flows upward and is humidified as water evaporates from the brine. Thus, the humidification section 120 functions like an evaporator for the brine. Only a small fraction of the hot brine 110 evaporates, and the unevaporated portion leaves the system as cooled waste brine 115.

After humidification, the air 130 flows downward over the surface of a condenser 140 that has the feed stream of brine 105 flowing upward within it. The product water 150 condenses on the condenser. The heat released during condensation raises the temperature of the feed stream 105 of brine flowing within the condenser 140. A fan 160 recirculates the air between the humidification section 120 and condenser 140. In the experimental unit built by Farid, the final heating of the feed stream 105 by an external source of thermal energy 170 before it is delivered to the humidification section is done in solar collectors but other sources of heat can be used.

A common measure of efficiency for a desalination process is its Gain Output Ratio (GOR). If steam is the thermal energy source driving the desalination process, then the GOR is the pounds of water produced per pound of steam. A large MSF facility may have a GOR between 9 and 12. HD plants have demonstrated GORs in the range of 5 to 10.

Müller-Holst, Engelhardt, Herve and Scholkopf built and tested a HD plant that was similar to Fari's experimental unit except that the air circulated by natural convection. This later HD plant is shown in FIG. 1.3 of the previously cited review paper by Al-Hallaj and Selman. They used an extruded plastic plate for the condensing heat exchanger 140 and polypropylene fleece as the porous bed of contact media 122 in the humidification section 120. They reported a GOR of 3 to 4.5 in field operation and a GOR of 8 in steady state laboratory operation.

Beckman describes the HD process shown in FIG. 3, referred to as a carrier-gas process, in which a fan 160 moves air 170 from an evaporation chamber 180 (humidification) to a dew-formation chamber 190 (dehumidification) (Beckman, "Carrier-Gas Enhanced Atmospheric Pressure Desalination," Final Report, Arizona State University, Tempe, Ariz., Cooperative Agreement No. 99-FC-81-0186, Desalination Research and Development Program Report No. 92, October 2002). A thermally conductive wall 195 separates the evaporation chamber 180 from the dew-formation chamber 190. The brine feed 175 is delivered to the top of the thermally conductive wall 195 in the evaporation chamber 180. The air 170 is humidified as it flows upward over the downward flowing brine feed 175. After humidification, the air is heated by an air heater 165 before it passes into the dew-formation chamber 190. In the dew-forming chamber 190 condensate 172 forms on the thermally conductive wall 190.

As in other HD processes, Beckman's carrier-gas process operates at atmospheric pressure. However, it differs from the other HD processes previously described in that the evaporation chamber 180 (which functions like a humidification section) and the dew-formation chamber 190 (which functions like a condensing heat exchanger) share a common, thermally conductive wall 195. The heat released during condensation is transferred to the evaporation chamber 180 where it causes additional evaporation. Beckman's carrier-gas process, also referred to as "Dewvaporation" is used in a commercially available desalination system manufactured and sold by Altela, Inc., of Albuquerque, N. Mex.

SUMMARY OF THE INVENTION

According to an exemplary embodiment of the present invention, a thermal distillation apparatus for separating a volatile solvent from a solution composed of the solvent and one or more non-volatile components comprises: one or more vertical, planar evaporation surfaces that are wetted with the solution, and from which at least some of the volatile solvent evaporates; one or more vertical, planar condensers, each condenser having an external surface in close proximity to, but not touching, a corresponding one of the one or more evaporation surfaces, and on which vapors of the solvent condense, releasing thermal energy that heats a flow of the solution moving upward within the condenser; spacers that prevent contact between the evaporating surfaces and the external surfaces of the corresponding condensers, a combined area of contact between the spacers and the evaporating surface being less than 50% of the total external surface area of the evaporating surface and the combined area of contact between the spacers and the corresponding condenser being less than 50% of the total external surface area of the corresponding condenser; means for supplying a flow of the solution from a solution feed source to the one or more condensers; means for further heating the flow of solution after the solution exits the condensers at a top portion of the condenser; means for delivering the further heated solution to a top portion of the one or more evaporating surfaces; means for collecting the condensate produced on the external surfaces of the one or more condensers without the condensate being contaminated by solution; means for collecting an unevaporated portion of the solution from the one or more evaporating surfaces; and an insulated enclosure within which at least a portion of each evaporating surface and each condenser are located, wherein spaces between the evaporating surfaces and the condensers are filled with a gaseous mixture composed of solvent vapor and one or more non-condensable gases, the gaseous mixture has a total pressure that is approximately equal to the pressure of the ambient surrounding the thermal distillation apparatus, and except for diffusion of the solvent vapor relative to the non-condensable gases, the gaseous mixture is stationary.

In an exemplary embodiment, the thermal distillation apparatus further comprises one or more vertical internal channels within each of the condensers, the solution flowing upward within the one or more internal channels, the one or more internal channels within each condenser being separated from each other by thin walls.

In an exemplary embodiment, the one or more thin walls that separate internal channels have openings that provide fluid communication between the internal channels.

In an exemplary embodiment, the one or more internal channels within each condenser are in fluid communication with a distribution cavity within a lower portion of that condenser.

In an exemplary embodiment, the thermal distillation apparatus further comprises metering devices for delivering approximately equal flows of the solution from a solution feed source into the distribution cavity of each condenser.

In an exemplary embodiment, each metering device delivers the solution to more than one location within the distribution cavity of each condenser.

In an exemplary embodiment, the condensers are made from an extruded plastic plate of a thickness less than 5 millimeters.

In an exemplary embodiment, the distance between each evaporating surface and a corresponding condenser is less than 5 millimeters.

In an exemplary embodiment, the external surfaces of the condensers on which the solvent vapor condenses have a surface treatment that discourages the formation of droplets.

In an exemplary embodiment, thin wicks are applied to the external surfaces of the condensers on which the solvent vapor condenses.

In an exemplary embodiment, the means for further heating brings the solution into direct contact with hot vapor of the volatile solvent.

In an exemplary embodiment, the means for further heating comprises a heat exchanger.

In an exemplary embodiment, one or more of the spacers are in direct contact with at least one of an evaporating surface or an external surface of a condenser, and external surfaces of the one or more spacers are hydrophobic.

In an exemplary embodiment, bottom portions of the evaporation surfaces are contoured so that the unevaporated portion of the solution is directed to a conduit that collects the unevaporated solution from the one or more evaporating surfaces.

In an exemplary embodiment, bottom portions of the condensers are contoured so that the condensate is directed to a conduit that collects condensate from the one or more condensers.

In an exemplary embodiment, for each condenser, the solution that flows within the condenser enters the condenser at a location at which the pressure within the condenser is close to ambient pressure and which is outside of the insulated enclosure.

In an exemplary embodiment, the external surfaces of the condensers comprise collection openings through which the condensate that forms on the external surfaces of the one or more condensers flows into the internal channels.

In an exemplary embodiment, the collection openings are formed in a lower portion of the external surface of each condenser, and the thermal distillation apparatus further comprises an impermeable surface disposed over the lower portion of an external surface of at least one of the condensers so that the condensate that flows down the external surface of the at least one condenser flows between the external surface and the opposed impermeable surface, the impermeable surface being attached to the external surface so that condensate enters the space between the two surfaces along a top edge of the impermeable surface and is retained in the space along side or bottom edges of the impermeable surface.

In an exemplary embodiment, the evaporation surfaces are thin, flat, rigid, wicking, porous sheets.

In an exemplary embodiment, the evaporation surfaces are thin, non-rigid, wicking, porous sheets that are held in tension over at least a portion of their extent so that the evaporation surfaces maintain a flat configuration.

In an exemplary embodiment, each evaporation surface is formed as a sleeve stretched over both the corresponding condenser and the corresponding spacers so that the evaporation surface is prevented from directly touching the external surface of the corresponding condenser.

In an exemplary embodiment, each condenser comprises first and second external surfaces, and the first and second external surfaces of each condenser comprise supply openings through which the solution exits after flowing upward within at least some of the internal channels.

In an exemplary embodiment, the thermal distillation apparatus comprises a steering element disposed on each of the first and second external surfaces of the condensers for directing the solution onto the evaporation surfaces and preventing the solution from flowing downward on the condensers' external surfaces.

In an exemplary embodiment, each condenser comprises first and second external surfaces, and the first external surface or the second external surface of each condenser comprises supply openings through which the solution exits after flowing upward within at least some of the internal channels.

In an exemplary embodiment, the thermal distillation apparatus comprises a steering element, disposed on the one of the first and second external surfaces of each condenser that comprises supply openings, for directing the solution onto the evaporation surfaces and preventing the solution from flowing downward on each of the condensers' external surface.

In an exemplary embodiment, the steering element divides the flow of solution into two or more approximately equal flows that are directed to different locations on the evaporation surface.

According to an exemplary embodiment of the present invention, a method for separating a volatile solvent from a solution composed of the solvent and one or more non-volatile components comprises the steps of: providing a thermal distillation apparatus comprising: one or more vertical, planar evaporation surfaces; one or more vertical, planar condensers, each condenser having an external surface in close proximity to, but not touching, a corresponding one of the one or more evaporation surfaces; spacers that prevent contact between the evaporating surfaces and the external surfaces of the corresponding condensers, a combined area of contact between the spacers and the evaporating surface being less than 50% of the total external surface area of the evaporating surface and the combined area of contact between the spacers and the corresponding condenser being less than 50% of the total external surface area of the corresponding condenser; means for supplying a flow of the solution to the one or more condensers; and an insulated enclosure within which at least a portion of each evaporating surface and each condenser are located; feeding a flow of the solution to the one or more condensers using the means for supplying; externally heating the flow of solution after the solution exits the condensers; delivering the externally heated solution to top portions of the one or more evaporating surfaces; wetting the one or more evaporation surfaces with the solution so that at least some of the volatile solvent evaporates from the one or more evaporation surfaces and vapors of the solvent condense on external surfaces of the one or more condensers so as to release thermal energy that heats the flow of the solution fed to the one or more condensers, spaces between the evaporating surfaces and the condensers are filled with a gaseous mixture composed of solvent vapor and one or more non-condensable gases, the gaseous mixture has a total pressure that is approximately equal to the pressure of the ambient surrounding the thermal distillation apparatus, and except for diffusion of the solvent vapor relative to the non-condensable gases, the gaseous mixture is stationary; collecting the condensate produced on the external surfaces of the one or more condensers without the condensate being contaminated by solution; and collecting an un-evaporated portion of the solution from the one or more evaporating surfaces.

BRIEF DESCRIPTION OF DRAWINGS

The features and advantages of the present invention will be more fully understood with reference to the following, detailed description of illustrative embodiments of the present invention when taken in conjunction with the accompanying figures, wherein:

FIG. 5A is a partially broken away, perspective view of a diffusion-gap thermal desalination apparatus according to an exemplary embodiment of the present invention;

DESCRIPTION OF PREFERRED EMBODIMENTS OF THE INVENTION

MD processes can be broadly characterized as locating an evaporating surface (i.e., the surface that is wet with hot brine) in close proximity to a condensing surface (i.e., the cooled surface on which condensate forms) but on opposite sides of a microporous membrane that allows water vapor to flow from the evaporating surface to the condensing surface but prevents the liquid brine from mixing with the pure condensate. As previously noted, an air gap may also be interposed between the microporous membrane and the condensing surface.

HD processes can be broadly characterized as locating the evaporating surfaces and the condensing surfaces at a distance from each other, which prevents the brine from mixing with the pure condensate, but then a forced or natural circulation of air must convey the water vapor from the evaporating surface to the condensing surface.

The present invention significantly improves both MD and HD technologies by positioning the evaporating and condensing surfaces in very close proximity to each other (as is the case with MD processes), but uses means other than a microporous membrane to prevent mixing between the brine and the pure condensate. The present invention, which is referred to herein as Diffusion-Gap Distillation (DGD), achieves very high fluxes of water vapor (i.e., production of pure water per unit of surface area) and very high GORs without the relatively high parasitic power requirement of a fan to recirculate air or the additional expense and maintenance requirement of a microporous membrane.

Figure 1:
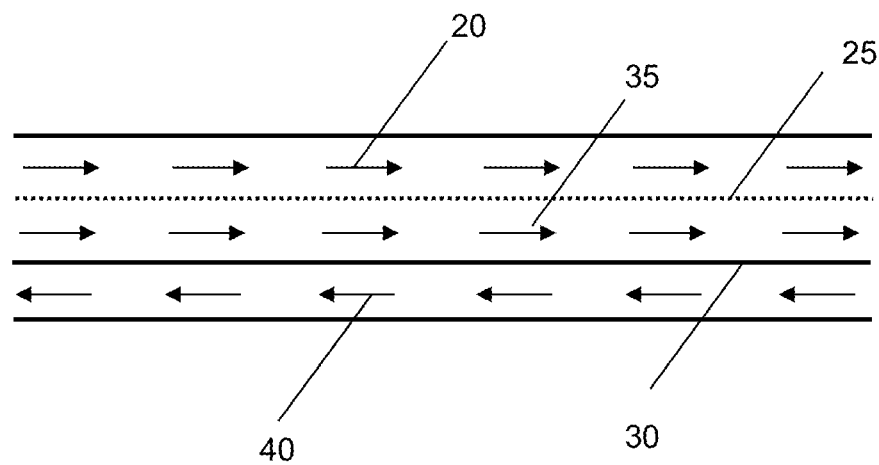
FIG. 1 is a diagram illustrating a conventional membrane distillation process.
Figure 2:
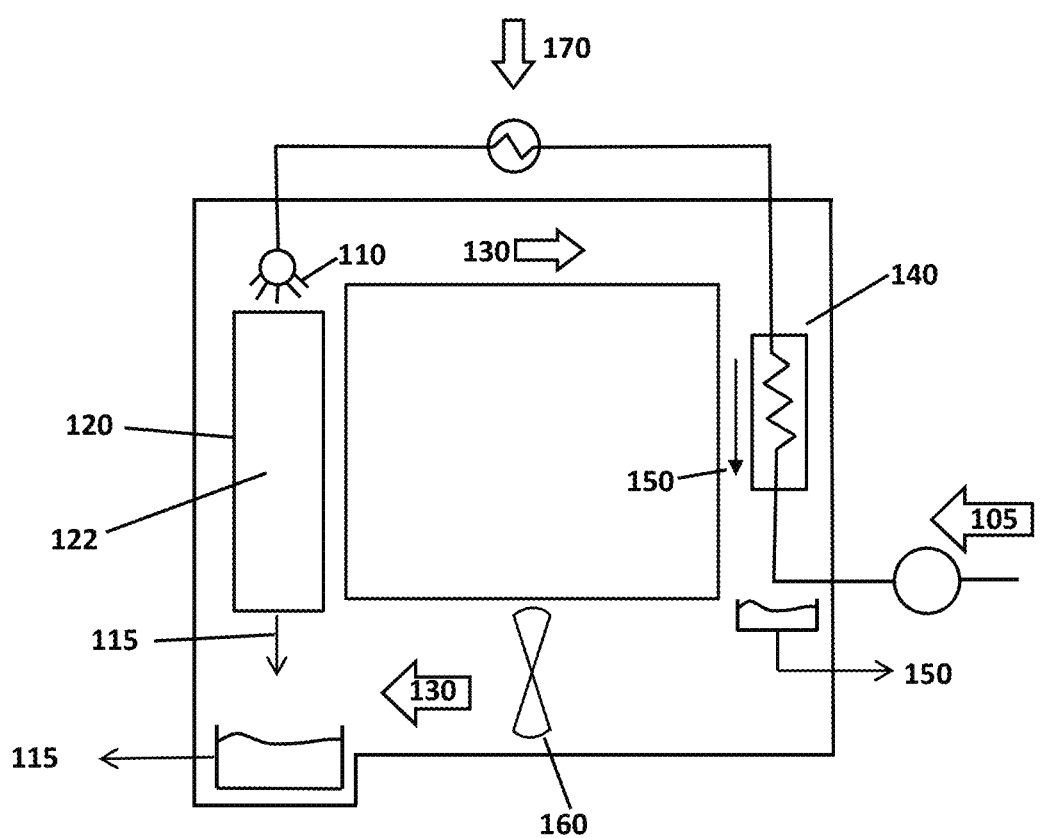
FIG. 2 is a diagram illustrating a conventional humidification-dehumidification distillation process.
Figure 3:
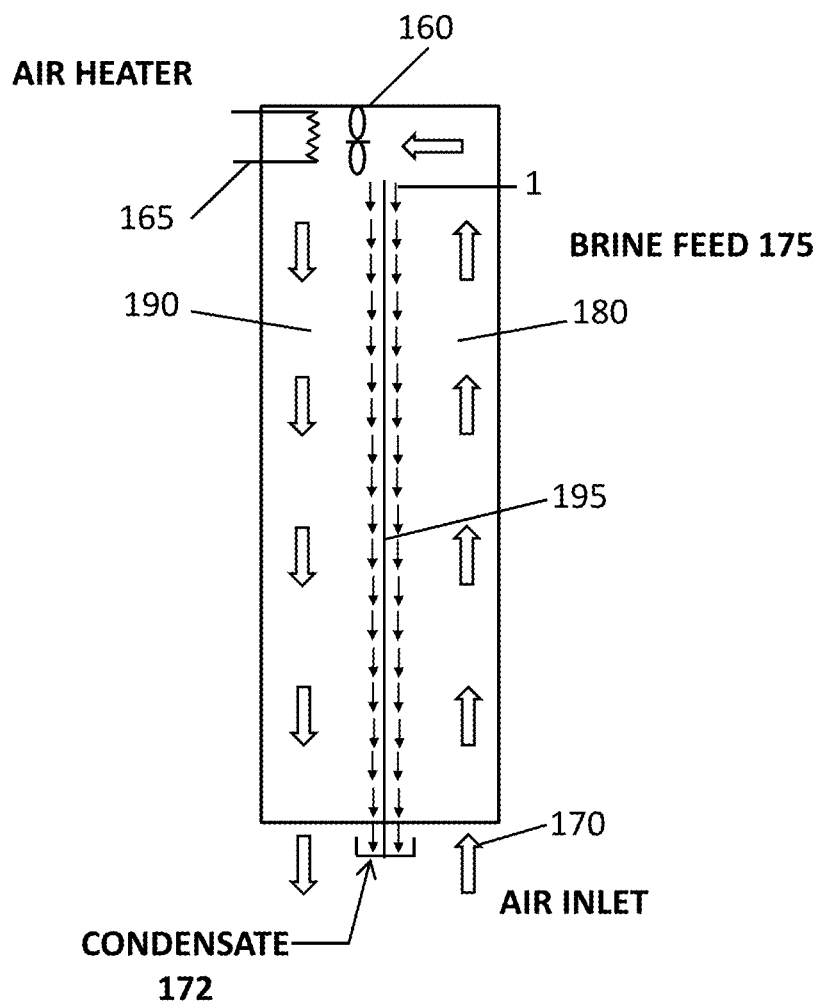
FIG. 3 is a diagram illustrating a conventional humidification-dehumidification distillation process.
Figure 4:
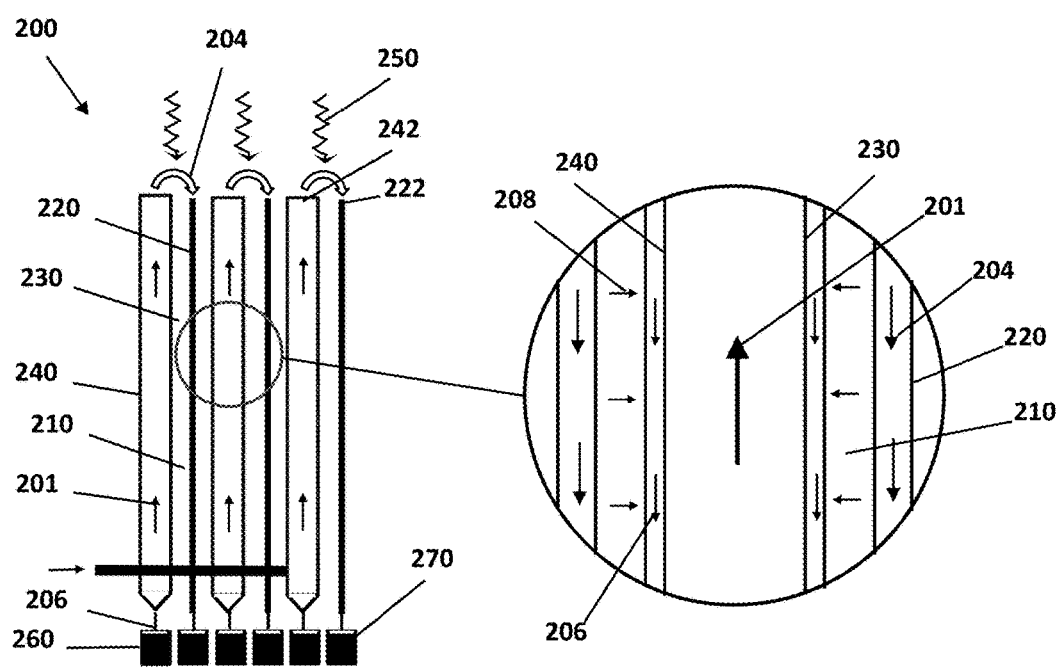
FIG. 4 is a diagram illustrating a diffusion-gap thermal desalination process according to an exemplary embodiment of the present invention.

FIG. 4 illustrates a Diffusion-Gap Distillation apparatus 200 according to an exemplary embodiment of the present invention applied to the desalination of seawater brine. It should be appreciated that this DGD could be used to separate volatile solvents other than water from solutions other than seawater. As shown in FIG. 4, a planar, thin vertical evaporator 220 is wetted with warm or hot brine 204. This evaporator 220 is positioned directly opposed to a planar, vertical surface on which condensation occurs, i.e., the condensing surface 230. The condensing surface 230 is the external surface of a planar, thin heat exchanger, referred to as a condenser 240, which is internally cooled by a feed stream of brine 201. The gap 210 between the evaporator 220 and the condensing surface 230 is naturally filled with a mixture of air and water vapor with a total pressure that equals the pressure of the ambient surrounding the DGD apparatus. During the operation of a DGD process, the source of the condensate 206 on the condensing surface 230 is the water vapor 208 that evaporates from the brine 204 on the evaporator 220 and diffuses through the air in the gap 210. The heat released as the water vapor condenses is transferred to the feed stream of brine 201 that flows within the condenser 240. The temperature of the feed stream of brine 201 increases as it flows upward within the condenser. After leaving at the top of the condenser 240, the feed stream of brine 201 is further heated by an external source of thermal energy 250 to its maximum temperature before it is delivered to the top of the evaporator 220.

Both the brine 204 on the evaporator 220 and the condensate 206 on the condensing surface 230 flow downward under the influence of gravity. The condensate is collected in a condensate trough 260 that is positioned under the condensing surface, and the exiting brine 204, now cool due to the water vapor 208 that has evaporated from it, is collected in a waste brine trough 270. The condensate 206 is the pure product water from the DGD apparatus. The brine 204 in the waste brine trough 270 can be either discarded (presumably in an environmentally responsible manner), can be processed in a second DGD apparatus, or a fraction of it can be mixed in with the feed stream 201 and processed again in the same DGD apparatus.

In order for the DGD process to work, there must be a vapor pressure difference that drives water vapor from the evaporator 220, across the gap 210, to the condensing surface 230. This vapor pressure difference is created by the temperature difference between the brine 204 flowing down the evaporator and the brine 201 flowing upward within the condenser. At each vertical position, the temperature of the downward flowing brine 204 must exceed the temperature of the directly opposed, upward flowing brine 201 within the condenser. This temperature difference creates a vapor pressure for water at the evaporator that is higher than the vapor pressure of water on the condensing surface.

During the operation of the DGD apparatus 200, there are positive, vertical temperature gradients on both the evaporator 220 and condensing surface 230, i.e., the temperature increases with increasing height. To a close approximation, these two temperature gradients produce a constant temperature difference between the condensing surface and the evaporator directly opposed to it.

In the DGD apparatus 200, the feed stream of brine leaves the condenser at its top 242, is further heated by an external source of thermal energy 250 and then is delivered to the top 222 of the evaporator. In some applications it will be most effective to further heat the brine by bringing it in direct contact with steam. In other applications, the brine can be further heated in a separate heat exchanger. Regardless of the external source of thermal energy, the temperature difference across the gap at this top location is the temperature difference that approximately persists down the entire length of the gap.

The hot brine 204 cools as it flows down the evaporator 220. The causes of this cooling are (a) conductive heat transfer, (b) radiative heat transfer, and (c) evaporation of water, all three processes resulting in a flow of thermal energy from the evaporator 220, across the gap 210 to the cooler condensing surface 230. The first two causes are parasitic losses on the DGD process since they cool the brine without producing condensate. Fortunately, under typical conditions for the operation of a DGD apparatus (e.g., seawater heated to 100° C. and a gap 210 of between 2 and 5 mm), the cooling effect of conductive heat transfer and radiative heat transfer will be small (e.g., the cooling effect due to evaporation alone will be 80% or more of the total cooling effect), and the amount of condensate produced is approximately proportional to the change in temperature of the brine as it flows down the evaporator 220.

The amount of external thermal energy that drives a DGD process is directly proportional to the change in temperature of the brine as it is heated after it leaves the top of the condenser 242 and before it is delivered to the top of the evaporator 222. Thus, to a rough approximation, the efficiency (GOR) of the DGD process will equal the total change in temperature of the brine as it flows down the evaporator (which, as explained earlier, is proportional to the amount of water that evaporates and then condenses to form the pure product water) divided by the change in temperature of the brine as it is heated by the external source of thermal energy.

A fundamental effect that reduces the efficiency of a DGD process is the depression in the equilibrium water vapor pressure caused by salt dissolved in water. This phenomenon is reflected in the higher boiling points of salt solutions compared to pure water. At one bar pressure, seawater boils at approximately 100.5° C. whereas pure water boils at 100° C. If one were to deliver seawater at 100.5° C. to the top of the evaporator 220 of a DGD apparatus, the highest temperature for condensing pure water on the condensing surface directly across the gap at the top of the condenser 242 would be 100° C. Since the upward flowing feed stream of brine can at most be heated up to the temperature of the water condensing on the outside of the condenser, the feed stream of brine must leave the condenser at a temperature no higher than 100° C. At a minimum, external energy then would be needed to boost the temperature of the seawater leaving the top of the condenser 0.5° C.

In a practical DGD desalination plant, the temperature difference across the gap 210 must be considerably larger than 0.5° C. The cost of water produced in a DGD desalination plant depends on both the cost of the energy to run the process and the capital cost to build the plant. Whereas a small temperature difference across the gap between the evaporator 220 and the condensing surface 230 produces a high GOR (which reduces the cost of energy to run the process), it produces a small driving force to move water vapor from the evaporator to the condensing surface (i.e., it reduces the difference in water vapor pressure). Thus, the flux of water vapor (kg/s-m2) from the evaporator to the condensing surface will decrease, and the amount of total surface area will increase for a given capacity plant, when the temperature difference across the gap between these two surfaces decreases. A DGD desalination plant that produces the lowest cost of water will operate at a temperature difference across the gap that balances the competing needs of reducing the amount of energy needed to run the plant and reducing its capital cost (i.e., reducing the amount of surface area within the plant).

It is possible to both increase the GOR of a DGD desalination plant and reduce the size of its condensers 240 and evaporators 220 by decreasing the size of the gap 210 between these two components. A DGD process, like all HD processes, operates at ambient pressure. Under this condition and with a maximum temperature of the condensed water less than 100° C., the composition of the gases in the gap between the evaporator and condenser is always part air and part water vapor. Unlike a conventional MSF process, in which all air has been removed from the space between the evaporator and condenser, water vapor must diffuse through air in a DGD process. This diffusion is the most important effect limiting the flux of water vapor. The resistance imposed by diffusion will decrease directly in proportion to the size of the gap 210.

Reducing the size of the gap 210 between the evaporator 220 and condenser 240 in a DGD apparatus is the single most important design challenge in engineering an economically competitive DGD desalination plant. The evaporator 220 will have a falling film of brine 204 and the condensing surface 230 will have a falling film of condensate 206. (Unlike a MD process, a DGD apparatus will not have a microporous membrane separating the evaporator and the condenser.) As the gap between these two surfaces decreases, the possibility increases that the liquid films flowing on two opposing surfaces will touch, leading to contamination of the condensate with brine. Effects that can make the liquid films on two opposing surfaces touch include, but are not limited to, (1) imperfections in the fabrication of the DGD apparatus, (2) formation of droplets on the condensing surface, (3) formation of relatively thick rivulets of brine on the evaporating surfaces, and (4) thermally induced changes in dimensions of components that distort the parallel, planar features of the evaporating and/or condensing surfaces.

Figure 5B:
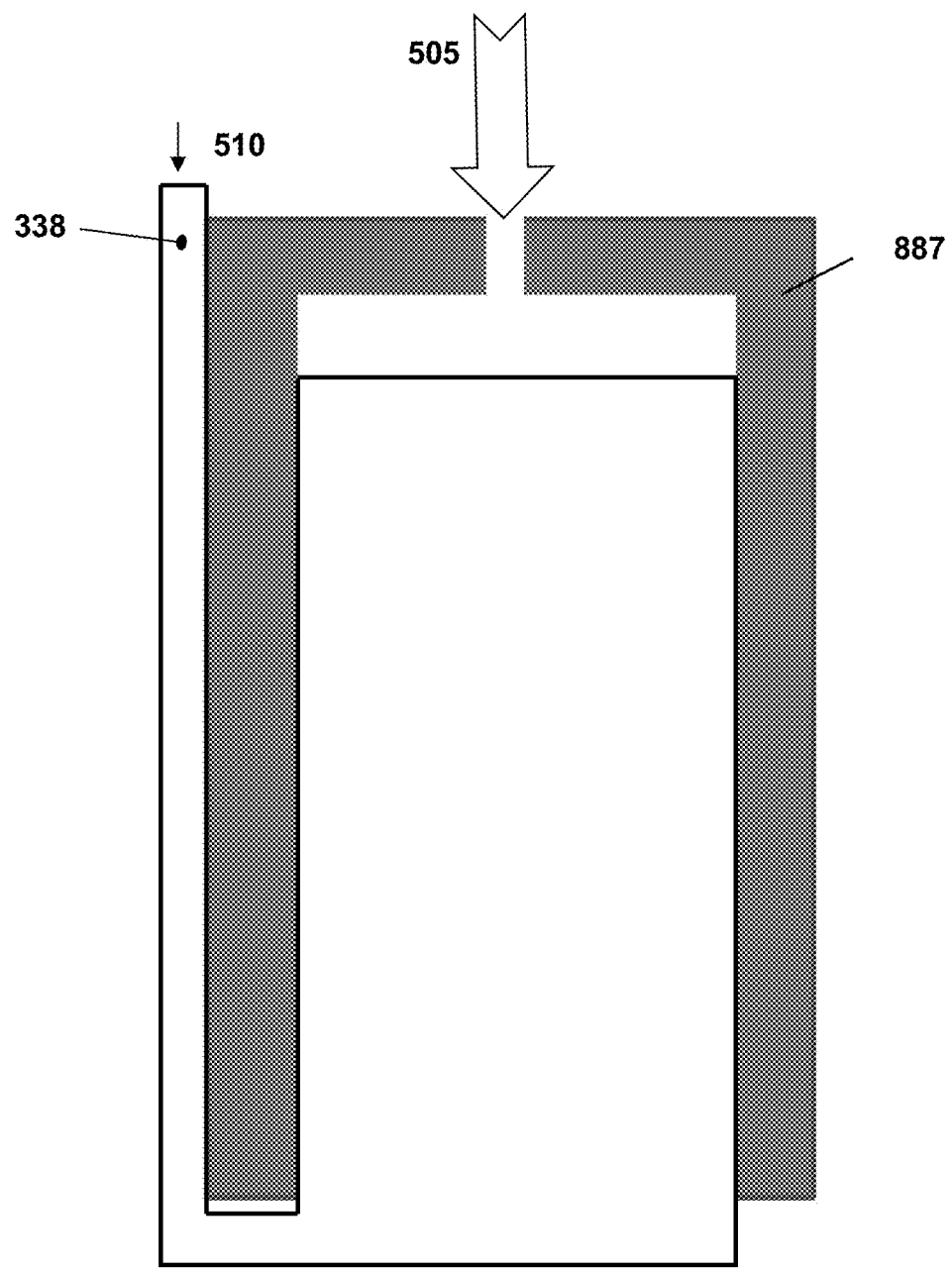
FIG. 5B illustrates an enclosure of a diffusion-gap thermal desalination apparatus according to an exemplary embodiment of the present invention.
Figure 6:
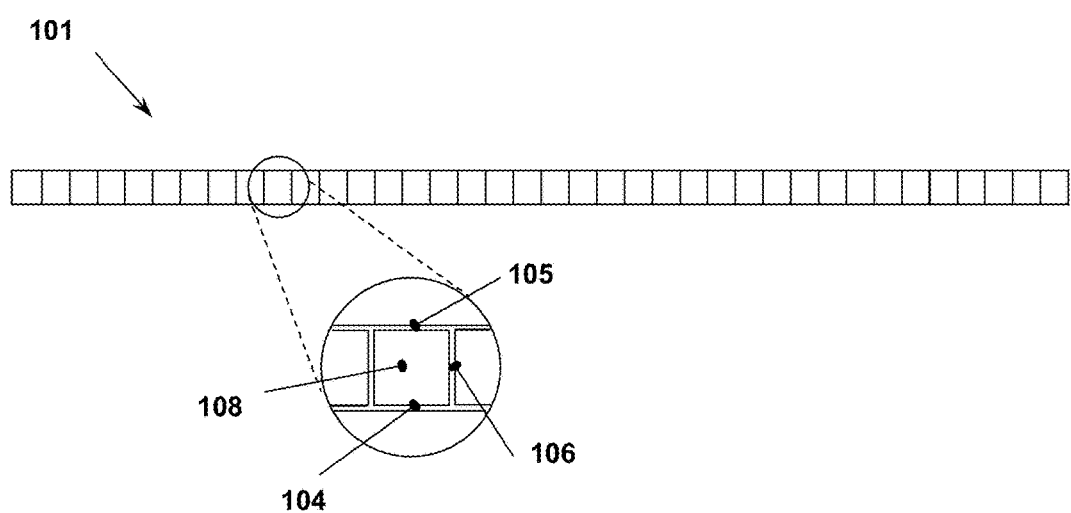
FIG. 6 is a partial cross-sectional view of a diffusion-gap thermal desalination apparatus according to an exemplary embodiment of the present invention.

FIG. 5A shows a DGD apparatus, generally designated by reference number 300, according to an exemplary embodiment of the present invention in which the external source of thermal energy 250 is steam. The DGD apparatus 300 includes a condenser 340. The condenser 340 is a twin-wall plastic extrusion that has internal channels 108 through which the feed brine 510 flows upward, the internal channels being defined by thin webs 106 that connect the front wall 104 and back wall 105 of the twin-wall extrusion. (The cross section of the twin-wall plastic extrusion 101 is shown in FIG. 6, with the features of the extrusion appropriately labeled.) The thickness of the condenser 340 is important mostly as it impacts the cost and size of the DGD apparatus.

In general, thinner condensers are preferred. Twin-wall plastic extrusions that can be made into condensers are commonly available with thicknesses between 2 millimeters and 5 millimeters, although 2 millimeters should not be viewed as a fundamental lower limit on the thickness of the condenser.

The feed brine 510 is supplied to the condenser 340 from a side extension 338 that may be an integral part of the twin-wall plastic extrusion 101 that forms the condenser 340. The feed brine 510 first enters at the top edge of the side extension 338 through a supply tube 388 that is inserted into one of the internal channels 108 in the side extension. The feed brine 510 flows downward in the side extension until it intercepts the supply borehole 415s. (In the context of the embodiment of the invention shown in FIG. 5A, a borehole may be an internal conduit through which liquid can flow that is perpendicular to the webs 106 of an extruded plate, the borehole being made by drilling, piercing or otherwise creating aligned openings in multiple webs.) The feed brine flows horizontally through the supply borehole 415s to other internal channels 108 in the condenser 340 that are intercepted by the supply borehole 415s. The internal channels 108 in the condenser 340 and the side extension 338 that are intercepted by the supply borehole 415s are all sealed at their bottom edges so that brine cannot leave the internal channels at these locations. Furthermore, the internal channels that are in the crossover region 112 between the side extension 338 and the condenser 340 are sealed at their top edges and the supply borehole 415s is sealed at the location where it penetrates the edge of the side extension.

Several methods have been successfully used to seal both the openings of internal channels 108 and boreholes 415s at the edges of a twin-wall plastic extrusion. If the plastic is a thermoplastic polymer, the openings can be thermally welded closed. For all polymers and for plates with internal channels that are not plastic (i.e., a metal extrusion or a composite made by bonding a corrugated sheet between two flat sheets, as is described in more detail below) the openings can be sealed with an appropriate adhesive or sealant.

Figure 7:
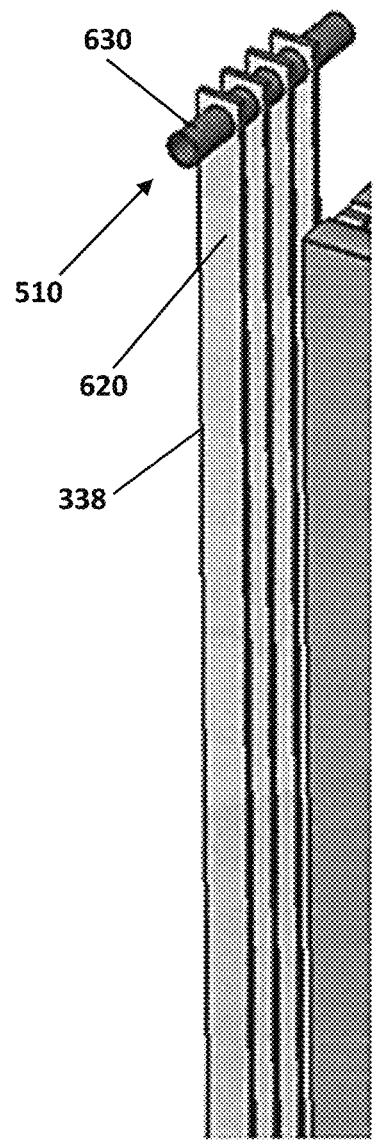
FIG. 7 is a perspective view of face surfaces useable in a diffusion-gap thermal desalination apparatus according to exemplary embodiments of the present invention.

The embodiment of the invention shown in FIG. 5A in which the feed brine 510 is supplied to the condenser 340 via a side extension 338 is advantageous because (1) the feed brine enters the side extension at a location where the pressure of the feed brine is close to the ambient pressure, (2) the entry location for the feed brine 510 into the side extension is remote from the location where the unevaporated brine flows off the evaporating surface 530, and (3) individual condensers 340 in an assembly of multiple condensers can be easily separated from each other if required by maintenance or other needs. As shown in FIG. 7, the feed brine 510 may enter the side extension 338 through a face surface 620. In this embodiment for an assembly of multiple plates, cylindrical hollow spacers 630 are bonded to the face surfaces 620 of the side extensions over openings in these surfaces. In an alternative embodiment, the side extension is shortened. However, if the side extension is shortened, it may be necessary to seal the top edges of the internal channels of the side extension to prevent the feed brine from exiting at those edges. In the limit, the height of the side extension could be reduced to a height no greater than is needed to accommodate the cylindrical hollow spacers 630.

In the embodiment shown in FIG. 5A, several spaced apart horizontal boreholes 415 that extend almost the entire width of the condenser 340 penetrate the webs 106 between internal channels 108 at different elevations. These boreholes 415 ensure that a bubble of non-condensable gases that may form as the temperature of the feed brine increases and which may anchor itself to the wall of an internal channel cannot block the flow of brine in an entire channel 108 since the boreholes provide a means for the brine to flow between channels. The boreholes are sealed where they penetrate the edge of the plate, one edge seal 420 being shown in FIG. 5.

Either a thin wick 430 is bonded to both front and back surfaces of the condenser 340 or alternatively, the surfaces of the condenser are treated so that they are hydrophilic. The wick 430 or alternative surface treatment ensures that the condensation does not produce drops that may bridge the gap between the evaporating surface 440 (described in more detail below) and the condenser 340. If a thin wick 430 is used to prevent droplets from forming on the condenser it should be as thin as practical so that it does not interfere with heat transfer to the feed brine that flows upward within the condenser.

Thin evaporating surfaces 440, which can be a woven fabric (preferably, but not limited to polymer, glass, ceramic or natural fibers), non-woven fabric or sheet (again, preferably, but not limited to polymer, glass, ceramic or natural fibers), thin flocked film or sheet, or paper-based sheet (other thin, wicking surfaces being possible), are positioned parallel to both the front and back surfaces of the condenser, the gap between each evaporating surface 440 and its opposed condenser 340 surface being less than 5 millimeters. The evaporating surfaces 440 should be both wicking and hydrophilic so that they readily spread the downward-flowing brine into a thin film. The evaporating surfaces may be rigid or non-rigid. Also, the evaporating surfaces 440 should be sufficiently thick and porous so that the downward-flowing brine is mostly contained within the evaporating surface. This last requirement prevents the formation of thick rivulets of downward-flowing brine from forming, which, as previously discussed could lead to contamination of the condensate by the brine. At a minimum, each evaporating surface 440 overlaps the section of its opposed condenser that is between the supply openings 450 and the supply borehole 415s. (Only a small corner of the evaporating surface 440 is shown in FIG. 5A so that the underlying features are revealed.)

Hydrophobic spacers 470 are located between the evaporating surfaces 440 and the condenser 340 to insure that the evaporating surfaces 440 do not touch the condenser 340. Since these spacers 470 touch both the evaporating surfaces 440 and the condenser 340 they should be hydrophobic so that they do not encourage the flow of liquids between these two surfaces. In some applications, it may be advantageous to apply a super-hydrophobic coating to the spacers 470, such as, for example, a super-hydrophobic coating called NeverWet®, available from Ross Nanotechnologies, LLC of Lancaster, Pa., USA. Furthermore, since no condensation can occur on the portions of the condenser 340 that are covered by the hydrophobic spacer 470, this covered area should be a small percentage of the condenser's external surface area, preferably less than 50%, more preferably less than 20%, and even more preferably, less than 5%. Similarly, the area of an evaporating surface 440 that is covered by hydrophobic spacers 470 should be a small percentage of the evaporating surface 440, preferably less than 50%, more preferably less than 20%, and even more preferably, less than 5%. Except for these hydrophobic spacers and in some applications thin wicks that are bonded to the external surfaces of the condensers 340, the space between the evaporating surfaces 440 and the external surfaces of the condensers 340 contain only films of liquid that flow on the surfaces and gases that, except for the diffusion of condensable and non-condensable components relative to each other, are stationary.

In implementations where the evaporating surface 440 is not rigid, it can be kept flat by putting it in tension. For example, the evaporating surface 440 may be a knitted nylon fabric that is sewn into a sleeve that is stretched over the condenser 340, with edge spacers (similar to the edge spacers 473 in FIG. 8) maintaining a gap between the evaporating surfaces 440 and the condensers 340.

The internal channels of the condenser 340 may be open at the top so that gases that may desorb from the brine as its temperature increases can readily leave from the condenser.

Supply openings 450 are located in one face of the condenser 340 near, but below its top edge. The heated feed brine exits from the internal channels 108 through the supply openings 450 and flows onto the evaporating surface 440. Although it is possible to place supply openings on both faces of the condenser 340, placing the supply openings 450 on only one face insures that all evaporating surfaces 440 have equal flow rates of hot evaporating brine 530, (i.e., if supply openings were on both faces, liquid surface tension effects and differences in the supply openings might significantly and unpredictably bias the flow towards one side). Also, although it is possible for the brine to leave the condenser 340 at the top edge of the condenser 340, placing the supply openings below the top edge of the condenser insures that bubbles that may get trapped at the top edge of the condenser 340 do not block the flow of brine through the supply openings 450. Finally, placing the supply openings 450 so that they overlap a borehole 415, as shown in FIG. 5, allows a relatively few supply openings to effectively deliver the brine from all channels 108 within the condenser 340 that have upward flowing brine.

A U-shaped spacer 480 is bonded to the condenser 340 so that the supply openings 450 are within the U-shape. This U-shaped spacer 480 traps the feed brine leaving the supply openings 450 and directs the brine towards the evaporating surface 440. After leaving the supply openings 450 the brine is further heated by steam 505 that is supplied to the top of the condenser 340. The hot, evaporating brine 530 flows down the evaporating surface 440. Because the U-shaped spacer 480 is bonded to the condenser 340, it prevents brine from flowing onto the wick 430 and contaminating the condensate. Furthermore, since the U-shaped spacer 480 is in contact with both the evaporating surface 440 and the condenser 340 its exposed surfaces should be hydrophobic (or super-hydrophobic) so as to discourage the flow of liquid between these two surfaces.

The condensate 540 that forms in the wick 430 flows under the top edge of an impermeable film 490 which is bonded to the condenser 340 along the film's left, right and bottom edges. The condensate 540 that flows under the film 490 then flows by gravity through the collection openings 117 in the surface of the condenser 340 and into a collection internal channel, the collection internal channel being one of the internal channels 108 in the condenser 340 that has been sealed or plugged locally in the region denoted by the dotted circle 380 and which is not intercepted by the supply borehole 415s so that the collected condensate is isolated from the brine that flows within the condenser 340. The collected condensate leaves the collection internal channel via a collection tube 390 that is sealed into the open bottom end of the collection internal channel and which directs the condensate away from the cooled brine that flows off the evaporating surface 440.

Figure 8A:
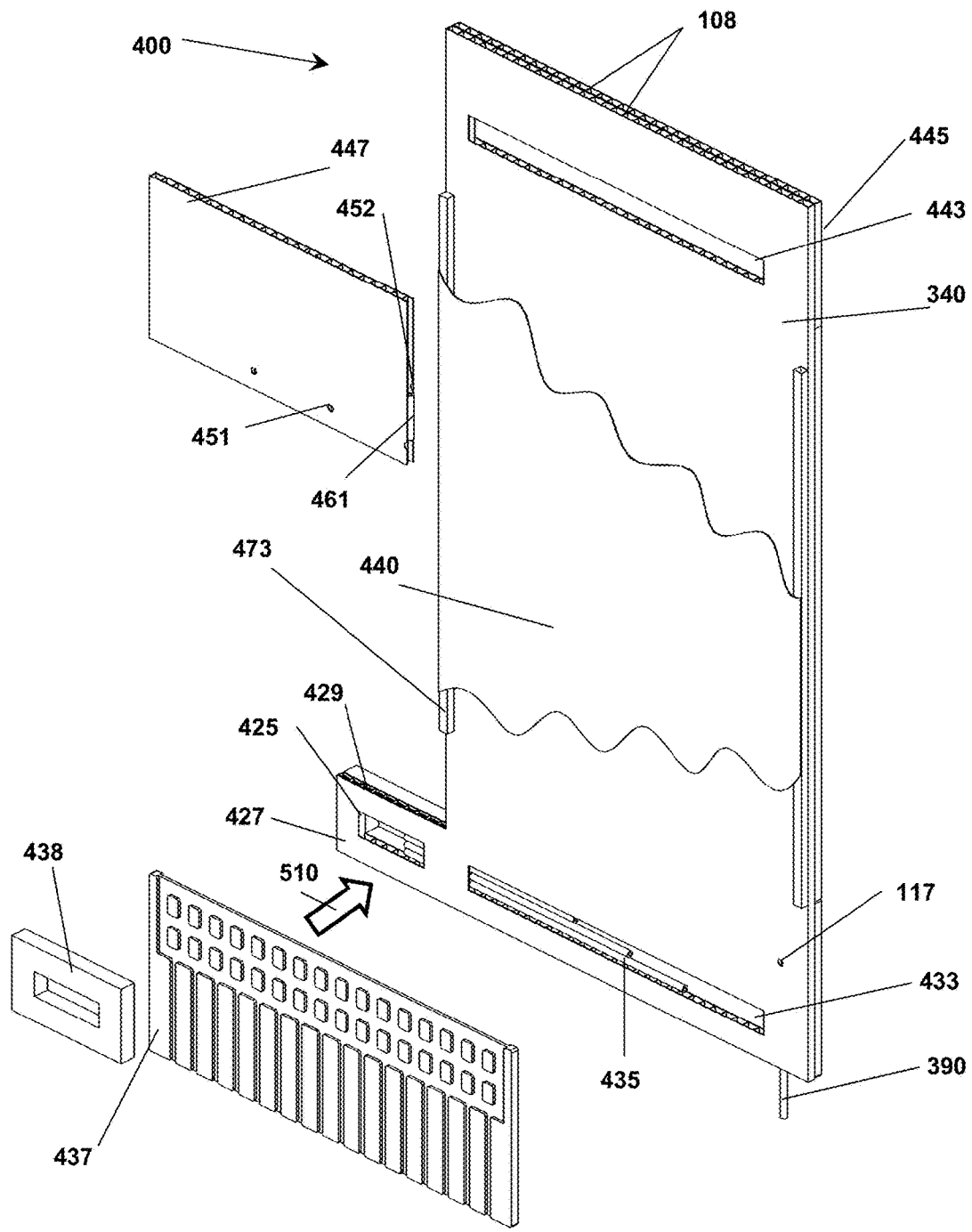
FIG. 8A is a partially exploded, partially broken away perspective view of a diffusion-gap thermal desalination apparatus according to an exemplary embodiment of the present invention.
Figure 8B:
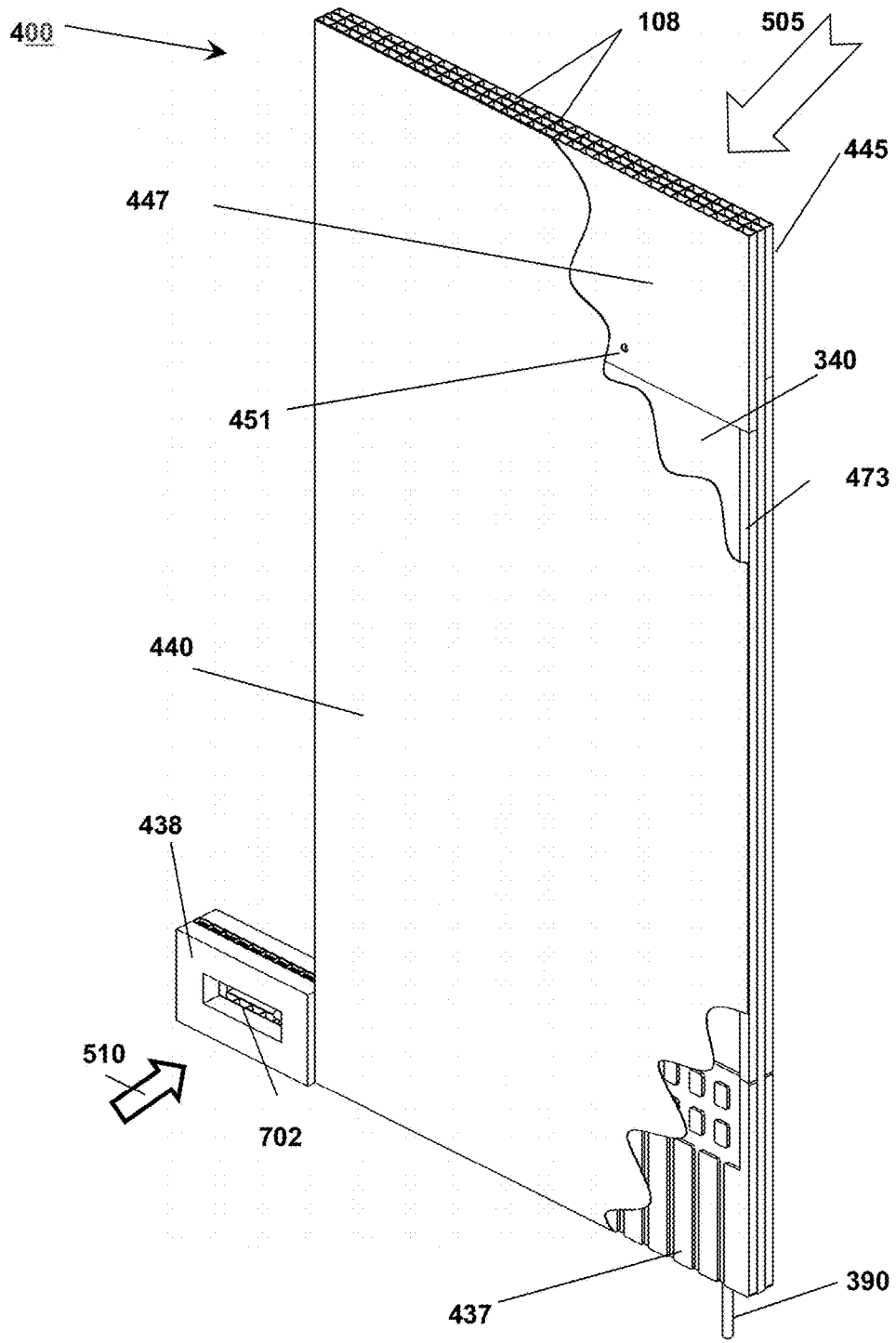
FIG. 8B is a partially broken away perspective view of a diffusion-gap thermal desalination apparatus according to an exemplary embodiment of the present invention.

FIGS. 8A and 8B show a DGD apparatus, generally designated by reference number 400, according to another exemplary embodiment of the invention. FIG. 8A shows a partially exploded view of the DGD apparatus 400 that reveals features that would otherwise be hidden. Similar to the embodiment shown in FIG. 5A, the condenser 340 is a twin-wall plastic extrusion that has internal channels 108 through which the feed brine 510 flows upward. The feed brine 510 enters the condenser 340 through a rectangular inlet opening 425 that penetrates through a shortened side extension 427 on the lower left side of the condenser 340. Edge seals 429 applied to the top edge openings and bottom edge openings (the bottom edge openings being hidden in FIG. 8A) of the internal channels 108 within the shortened side extension 427 prevent the feed brine that enters inlet opening 425 from exiting at these edge openings.

The feed brine 510 that enters the condenser 340 through the inlet opening 425 flows from the shortened side extension 427 into a rectangular distribution cavity 433 that is cut, punched, milled or otherwise produced in the lower region of the condenser 340 through metering tubes 435. As shown in FIG. 8B, bottom spacer inserts 437 cover and seal both the front and back faces of the distribution cavity 433. The bottom spacer inserts 437 have features, to be described in more detail below, that assist with the collection of condensate from the surface of the condenser. Side extension inserts 438 with rectangular openings that are roughly congruent with the inlet openings 425 in the shortened side extensions 427 are bonded to the faces of the shortened side extensions 427 so that an inlet manifold 702, which is shown in FIG. 8B, is formed when multiple condensers 340 are stacked with side extension inserts 438 interleaved with the shortened side extensions 427.

The metering tubes 435 penetrate one or more webs 106 in the internal channels 108 that are within the condenser 340 between the inlet opening 425 and the distribution cavity 433, and the metering tubes 435 are sealed to these webs so that essentially all the brine feed that enters the distribution cavity 433 must pass through the metering tubes 435. The pressure drop of the brine feed flowing through the metering tubes 435 should be large compared to the pressure drop of the brine flowing the length of the inlet manifold 702. This relationship between pressure drops insures that each condenser 340 in an assembly of many condensers 340 that are fed from a common inlet manifold 702 receives approximately the same amount of brine feed. Furthermore, the metering tubes 435, by supplying the feed brine to several central locations within the distribution cavity 433 will help maintain equal flows of brine feed upward within the individual internal channels 108 that intercept the distribution cavity 433. Three metering tubes are shown in FIG. 8A, although fewer or more can be used. It should also be appreciated that the shape of the distribution cavity 433 and the inlet opening 425 can be other than a rectangle, other shapes possibly having advantages in regard to either withstanding pressure or evenly distributing the brine among the channels 108.

The bottom edge openings of the channels 108 that intercept the distribution cavity 433 are sealed so that the feed brine cannot leave the condenser 340 at its bottom edge. (Although it may not be necessary, the bottom edge openings of the channels 108 that separate the inlet opening 425 and the distribution cavity 433 can also be sealed as an added precaution against the feed brine leaving the condenser 340 at its bottom edge.)

The feed brine that enters the distribution cavity 433 flows upward within the internal channels 108 that intercept the distribution cavity and into the collection cavity 443 located near the top of the condenser 340. Similar to the distribution cavity 433, the collection cavity 443 is cut, punched, milled or otherwise produced in the condenser 340, and it can have a rectangular or non-rectangular shape.

As shown in FIG. 8A, the back face of the collection cavity 443 is sealed by a top cover plate 445 that is bonded to the condenser 340 so that brine cannot leave the collection cavity 443 at its back face. The top cover plate 445 should not significantly impede the flow of steam that, as described later, heats the brine as it leaves the external face orifices of the top distribution plate 447. A top cover plate 445 that is made from a twin-wall extruded plate and has vertical internal channels that are open at both edges of the top cover plate 445 may provide this desired function.

As shown in FIG. 8B, the front face of the collection cavity 443 is covered by the top distribution plate 447, which can be made from a twin-wall extruded plate. This top distribution plate 447 has one or more orifices both on its face that seals against the condenser 340 (i.e., the internal face) and its opposite face (i.e., the external face). Each internal face orifice 452, one of which appears in FIG. 8A at the edge of the top distribution plate 447 that is cut away, communicates with a channel 108 that also communicates with an external face orifice 451. When the top distribution plate 447 is sealed against the condenser 340, the internal face orifices 452 are within the collection cavity 443. The feed brine that enters the collection cavity 443, leaves this cavity through the internal face orifices 452 in the top distribution plate 447, flowing into the channels 108 within the top distribution plate 447 that communicate with the internal face orifices 452. The bottom edge openings of these channels are sealed so that the feed brine that enters the channels can only leave through the external face orifices 451. The channels in the top distribution plate 447 that do not communicate with internal and external face orifices, and therefore do not have brine feed flowing within them, should not be sealed at their top or bottom edges to allow the flow of steam that heats the feed brine after the brine leaves the external face orifices.

At feed brine flow rates typical of a DGD apparatus, the resistance to the brine flow in the internal channels 108 of the top distribution plate 447 (i.e., the pressure drop of the flow) will be very low (assuming these channels have a roughly square cross section with a dimension almost equal to the thickness of the top distribution plate). Because this resistance to the brine flow is low, it has been observed that surface tension effects at the internal face orifices 452 and the external face orifices 451 can create non-uniformities among the flows through these orifices, in the extreme totally blocking the flow through one or more orifices. These non-uniformities can degrade the performance of a DGD apparatus. They can be prevented by introducing uniform resistances to the brine flows within the channels of the top distribution plate 447 that are large compared to resistances caused by surface tension effects.

In one approach to introducing uniform flow resistances, which is revealed in the cut-away section of the top distribution plate shown in FIG. 8A, metering tubes 461 with an internal opening that is significantly smaller than the cross section of the channel 108 are inserted and potted into each channel that communicates with an internal face orifice 452 and external face orifice 451. With the metering tubes 461 in place, the resistance to the flow of feed brine is increased and the pressure head required to pass the flow of brine from the collection cavity 443 through the external face orifices 451 is large compared to surface tension effects at either the internal face orifice 452 or external face orifice 451. By using metering tubes 461 with identical geometries, the metering tubes 461 will maintain uniform flows among the orifices in the same top distribution plate. The performance of the metering tubes 461 can also be improved if their surfaces are easily wetted by the feed brine (i.e., the surfaces are hydrophilic) so that the dominant resistance to the flow of the feed brine is due to the feed brine's viscosity. The insertion of a porous, hydrophilic wick within the internal channel 108 in place of a metering tube or its insertion within a metering tube are alternative approaches to introducing uniform flow resistances.

Other means of creating an equalizing resistance to the flow of brine through each channel 108 in the top distribution plate 447 can be used, but in all cases, the additional resistance to flow will increase the pressure within the collection cavity. Since it is desirable that all brine that enters the collection cavity 443 exits the cavity via one of the internal face orifices 452 in the top distribution plate 447, the height of the condenser 340 above the collection cavity 443 must be sufficient to prevent brine from leaving the condenser at its top edge. (Since it is desirable that non-condensible gases that may evolve as the feed brine is heated do leave the condenser along its top edge this edge is preferably not sealed.)

Similar to the embodiment shown in FIG. 5A, the feed brine that exits the external face orifices 451 is heated by direct contact with steam 505 as the feed brine flows onto the evaporating surface 440. This steam is introduced at the top of the DGD apparatus 400 and flows down through the unsealed channels in the top distribution plate 447 and top cover plate 445 to a location where it comes in contact with the feed brine on the evaporating surface 440. The evaporating surface shown in FIG. 8A and FIG. 8B functions the same as the evaporating surface 440 in FIG. 5A, and so can be fabricated from the same materials as previously described and fashioned into the same shapes as previously described.

In FIG. 8A and FIG. 8B, edge spacers 473 on both faces of each condenser 340 maintain a uniform gap between the evaporating surfaces 440 and the condensers 340. In FIG. 8B, the evaporating surface 440 extends upward beyond the external face orifices 451 in the top distribution plate 447 and downward to the bottom edge of the bottom spacer insert 437. In addition to edge spacers 473 on the left and right edges of the condenser 340, as shown in FIG. 8A, spacers may be applied to the faces of the condenser 340 (similar to the spacers 470 shown in FIG. 5A) to maintain the gaps between the evaporating surfaces 440 and the condensers 340. All spacers preferably have exposed surfaces that are hydrophobic or super-hydrophobic to prevent the flow of liquid between the two surfaces.

During the operation of a DGD apparatus, water vapor will flow across the gaps from the hotter evaporating surfaces 440 to the cooler condenser 340. As with the embodiment shown in FIG. 5A, it is important that this water vapor condenses as a thin film on the condenser 340 and not as droplets. Whereas the thin wick 430 shown in FIG. 5A could again be used to promote film-wise condensation, the condenser 340 in FIG. 8A may have a surface treatment that makes the surface hydrophilic and discourages the formation of droplets. Surface treatments that could be used include corona treatment, plasma treatment, chemical etching and hydrophilic coatings that adhere to the condenser 340.

The condensate 540 that forms on the hydrophilic surfaces of a condenser 340 is removed from these surfaces through collection openings 117 near the bottom of the condenser 340. As previously described in association with FIG. 5A, the condensate that passes through these collection openings 117 flows into a collection internal channel 108 that is isolated from the internal channels through which feed brine flows. The condensate leaves this internal channel via a collection tube 390 that is sealed into the open bottom end of the collection internal channel and which directs the condensate away from the cooled brine that flows off the evaporating surface 440.

Figure 9A:
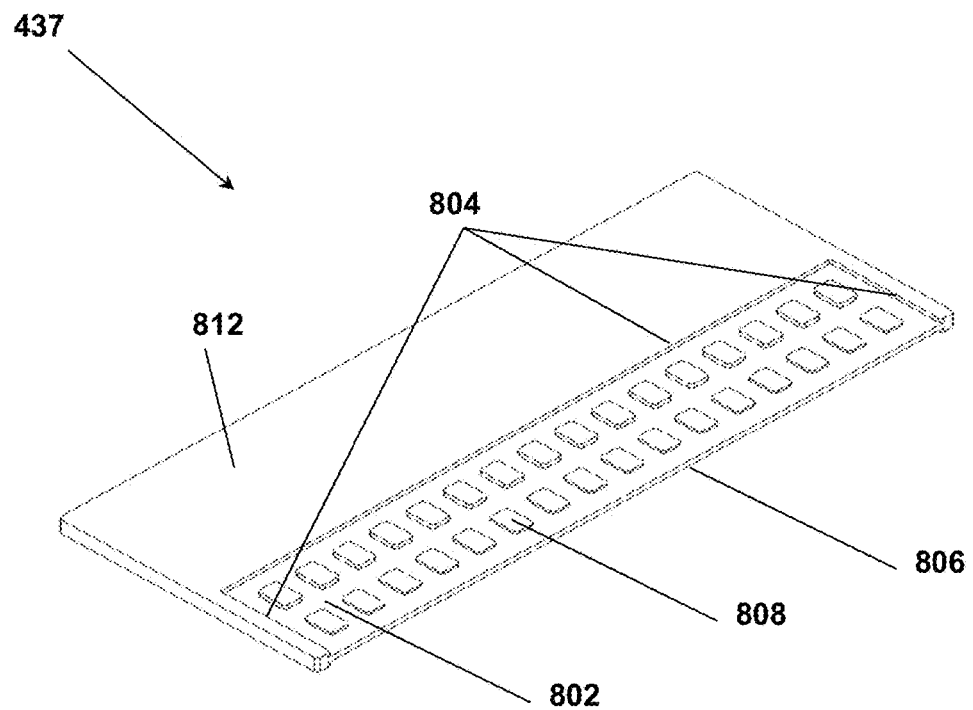
FIGS. 9A and 9B are perspective views of a cover section useable in the diffusion-gap thermal desalination apparatus according to exemplary embodiments of the present invention.
Figure 9B:
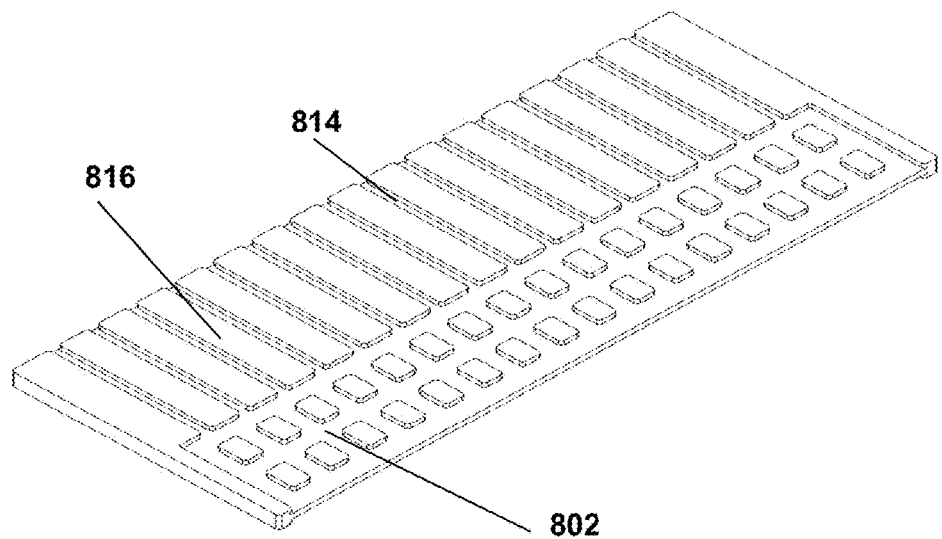

In FIG. 5A, as previously described, an impermeable film 490 which is bonded to the condenser 340 along the film's left, right and bottom edges collects the condensate and directs it towards the collection openings 117. Although an impermeable film may again be used, in FIG. 8B a bottom spacer insert 437 directs condensate to the collection openings 117. As shown in more detail in FIGS. 9A and 9B, the two faces of the bottom spacer insert 437 have different features. Both faces have recessed pockets 802 defined by left, right and bottom pocket edges 804. Within each recessed pockets is an array of pocket spacers 808, the array within one pocket matching and in alignment with the array in the pocket on the other face of the bottom spacer insert 437. A thin pocket web 806 separates the recessed pockets 802 that are on opposite faces of the bottom spacer insert 437.

The bottom spacer inserts 437 have a thickness equal to the gap between the evaporating surface 440 and the condenser 340. One face of the bottom spacer insert 437 has a flat cover section 812 and the other face has a section with parallel brine grooves 814, this second section referred to as the grooved section 816. A bottom spacer insert 437 is bonded to each side of each condenser 340 so that the flat cover section 812 of the bottom spacer insert 437 covers and seals the distribution cavity 433 at the bottom of the condenser 340.

A DGD apparatus composed of multiple condensers will have one evaporating surface centrally located in the gap between neighboring condensers. The evaporating surface will be captured at its sides by the edge spacers 473, at its top by a top cover plate 445 on one condenser and a top distribution plate 447 on the neighboring condenser, and at its bottom by the bottom spacer inserts 437. Although the evaporating surface is captured at its top between the top cover plate 445 and the top distribution plate 447, the top cover plate 445 should not interfere with the flow of feed brine out of the external surface orifices in the top distribution plate. A simple way to prevent this interference is to limit the extent of the top cover plate so that it does not cover the external surface orifices 451.

Although it is not essential to the operation of the DGD apparatus, the bottom spacer inserts 437 are shown with a grooved section 816 that captures the bottom of the evaporating surface. These grooves provide locations where the feed brine can flow past the bottom spacer inserts 437 and reach the bottom edge of the condenser 340 where the brine can be conveniently collected.

It should be appreciated that means can be used to collect condensate and direct the condensate towards a collection opening 117 in the surface of the condenser 340 other than the impermeable film 490 shown in FIG. 5A or the bottom spacer insert 437 shown in FIG. 8A. For example, a narrow wick attached to and running across the lower portion of the external surface of the condenser 340, and which does not touch the evaporating surface 340, can direct condensate by capillary action towards and into a collection opening.

It should also be appreciated that although the embodiments of a DGD apparatus shown in FIGS. 5A and 8A use spacers that are in direct contact with both the evaporating surfaces and condensing surfaces, alternative embodiments may be implemented in which either the evaporating surfaces, the condensing surfaces or both are connected to surfaces that neither condense nor evaporate and the spacers are in contact with these non-condensing/non-evaporating surfaces. One example of this alternative embodiment may include a condenser 340 similar to the one shown in FIG. 8A in which the channels 108 within the condenser 340 that are under the edge spacers 473 and near the edge spacers are sealed so that the feed brine cannot flow within them. With these channels sealed, condensation will not occur near the edge spacers 473. Similarly, the evaporating surface 440 may be modified so that portions of the evaporating surface are neither wicking nor hydrophilic, and the spacers are in contact with these non-wicking, non-hydrophilic portions.

The DGD process operates at relatively high temperatures (up to 100 C when the process is driven by atmospheric pressure steam). As such, the efficiency of all configurations of the DGD apparatus 200, 300, 400 will be improved if the DGD apparatus is located within a thermally insulated enclosure 887 as shown in FIG. 5B. For an embodiment with a side extension 338 as shown in FIG. 5B, the side extension, which has cool feed brine 510 flowing within it, is preferably not within the insulated enclosure.

The invention has been explained in applications that use thin, flat, twin-wall extruded plates, typically, but not necessarily made from plastic. Twin-wall extruded plates are now commonly available with very thin walls. However, it should be appreciated that the innovative elements of the invention may be applied to a thin, flat plate with internal, parallel channels manufactured by a means other than extrusion. As an example, common corrugated cardboard is a flat plate with internal, parallel channels. Although corrugated cardboard made from paper sheets would be difficult to use in the invention, a similarly configured plate made from two flat sheets that are bonded to a central corrugated sheet, where the sheets are either plastic or metal, could replace the twin-wall extruded plates that have been used in the examples of the invention.

An important features of a condenser is that it be thin with a flat front and back wall and that it allows for an internal, upward flow of liquid. These features could be realized in a flat plate with an internal passage that is not divided into discrete internal channels that are separated by thin webs.

Figure 10:
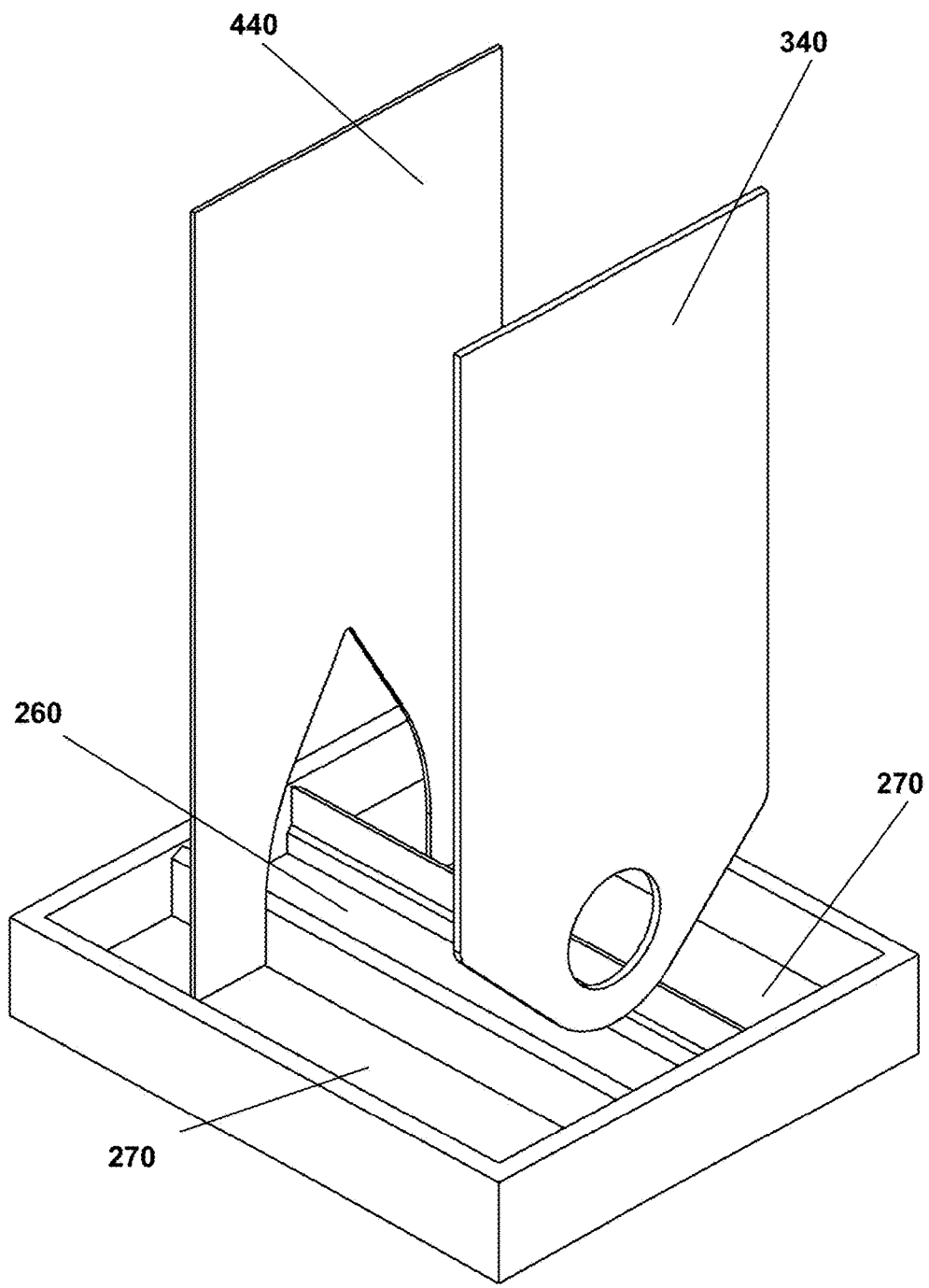
FIG. 10 is a perspective view of a diffusion-gap thermal desalination apparatus according to an exemplary embodiment of the present invention.

In an exemplary embodiment, the DGD process described herein may be applied so that the feed brine flows off the evaporating surface 440 directly into brine collection troughs 270 and the condensate flowed off the condenser 340 directly into condensate collection troughs. As shown in FIG. 10, this embodiment uses a condenser with angled bottom edges that direct the condensate to the collection trough 260 and an evaporating surface with angled bottom edges that direct the brine to one of two brine collection troughs.

Now that embodiments of the present invention have been shown and described in detail, various modifications and improvements thereon will become readily apparent to those skilled in the art. Accordingly, the spirit and scope of the present invention is to be construed broadly not limited by the foregoing specification.

What is claimed is:

1. A thermal distillation apparatus for separating a volatile solvent from a solution composed of the solvent and one or more non-volatile components, the apparatus comprising:

one or more vertical, planar evaporation surfaces that are wetted with the solution, and from which at least some of the volatile solvent evaporates;

one or more vertical, planar condensers, each condenser having an external surface in close proximity to, but not touching, a corresponding one of the one or more evaporation surfaces, and on which vapors of the solvent condense, releasing thermal energy that heats a flow of the solution moving upward within the condenser;

spacers that prevent contact between the evaporating surfaces and the external surfaces of the corresponding condensers, a combined area of contact between the spacers and the evaporating surface being less than 50% of a total surface area of the evaporating surface and a combined area of contact between the spacers and the corresponding condenser being less than 50% of the total external surface area of the corresponding condenser;

means for supplying a flow of the solution from a solution feed source to the one or more condensers;

means for further heating the flow of solution after the solution exits the condensers at a top portion of the condenser;

means for delivering the further heated solution to a top portion of the one or more evaporating surfaces;

means for collecting the condensate produced on the external surfaces of the one or more condensers without the condensate being contaminated by the solution;

means for collecting an unevaporated portion of the solution from the one or more evaporating surfaces; and an insulated enclosure within which at least a portion of each evaporating surface and each condenser are located, wherein spaces between the evaporating surfaces and the condensers are filled with a gaseous mixture composed of solvent vapor and one or more non-condensable gases, the gaseous mixture has a total pressure that is approximately equal to the pressure of the ambient surrounding the thermal distillation apparatus, and except for diffusion of the solvent vapor relative to the non-condensable gases, the gaseous mixture is stationary.

2. The thermal distillation apparatus of claim 1, further comprising one or more vertical internal channels within each of the condensers, the solution flowing upward within the one or more internal channels, the one or more internal channels within each condenser being separated from each other by thin walls.

3. The thermal distillation apparatus of claim 2, wherein the one or more thin walls that separate internal channels have openings that provide fluid communication between the internal channels.

4. The thermal distillation apparatus of claim 2, wherein the one or more internal channels within each condenser are in fluid communication with a distribution cavity within a lower portion of that condenser.

5. The thermal distillation apparatus of claim 4, further comprising metering devices for delivering approximately equal flows of the solution from a solution feed source into the distribution cavity of each condenser.

6. The thermal distillation apparatus of claim 5, wherein each metering device delivers the solution to more than one location within the distribution cavity of each condenser.

7. The thermal distillation apparatus of claim 2, wherein the condensers are made from an extruded plastic plate of a thickness less than 5 millimeters.

8. The thermal distillation apparatus of claim 1, wherein the distance between each evaporating surface and a corresponding condenser is less than 5 millimeters.

9. The thermal distillation apparatus of claim 1, wherein the external surfaces of the condensers on which the solvent vapor condenses have a surface treatment that discourages the formation of droplets.

10. The thermal distillation apparatus of claim 1, wherein thin wicks are applied to the external surfaces of the condensers on which the solvent vapor condenses.

11. The thermal distillation apparatus of claim 1, wherein the means for further heating brings the solution into direct contact with hot vapor of the volatile solvent.

12. The thermal distillation apparatus of claim 1, wherein the means for further heating comprises a heat exchanger.

13. The thermal distillation apparatus of claim 1, wherein one or more of the spacers are in direct contact with at least one of an evaporating surface or an external surface of a condenser, and external surfaces of the one or more spacers are hydrophobic.

14. The thermal distillation apparatus of claim 1, wherein bottom portions of the evaporation surfaces are contoured so that the unevaporated portion of the solution is directed to a conduit that collects the unevaporated solution from the one or more evaporating surfaces.

15. The thermal distillation apparatus of claim 1, wherein bottom portions of the condensers are contoured so that the condensate is directed to a conduit that collects condensate from the one or more condensers.

16. The thermal distillation apparatus of claim 1, wherein, for each condenser, the solution that flows within the condenser enters the condenser at a location at which the pressure within the condenser is close to ambient pressure and which is outside of the insulated enclosure.

17. The thermal distillation apparatus of claim 2, wherein the external surfaces of the condensers comprise collection openings through which the condensate that forms on the external surfaces of the one or more condensers flows into at least one of the internal channels.

18. The thermal distillation apparatus of claim 17, wherein the collection openings are formed in a lower portion of the external surface of each condenser, and the thermal distillation apparatus further comprises an impermeable surface disposed over the lower portion of the external surface of at least one of the condensers so that the condensate that flows down the external surface of the at least one condenser flows between the external surface and the opposed impermeable surface, the impermeable surface being attached to the external surface so that condensate enters the space between the two surfaces along a top edge of the impermeable surface and is retained in the space along side or bottom edges of the impermeable surface.

19. The thermal distillation apparatus of claim 1, wherein the evaporation surfaces are thin, flat, rigid, wicking, porous sheets.

20. The thermal distillation apparatus of claim 1, wherein the evaporation surfaces are thin, non-rigid, wicking, porous sheets that are held in tension over at least a portion of their extent so that the evaporation surfaces maintain a flat configuration.

21. The thermal distillation apparatus of claim 20, wherein each evaporation surface is formed as a sleeve stretched over both the corresponding condenser and the corresponding spacers so that the evaporation surface is prevented from directly touching the external surface of the corresponding condenser.

22. The thermal distillation apparatus of claim 2, wherein each condenser comprises first and second external surfaces, and the first and second external surfaces of each condenser comprise supply openings through which the solution exits after flowing upward within at least some of the internal channels.

23. The thermal distillation apparatus of claim 22, further comprising a steering element disposed on each of the first and second external surfaces of the condensers for directing the solution onto the evaporation surfaces and preventing the solution from flowing downward on the condensers' external surfaces.

24. The thermal distillation apparatus of claim 2, wherein each condenser comprises first and second external surfaces, and the first external surface or the second external surface of each condenser comprises supply openings through which the solution exits after flowing upward within at least some of the internal channels.

25. The thermal distillation apparatus of claim 24, further comprising a steering element, disposed on the one of the first and second external surfaces of each condenser that comprises supply openings, for directing the solution onto the evaporation surfaces and preventing the solution from flowing downward on each of the condensers' external surface.

26. The thermal distillation apparatus of claim 25, wherein the steering element divides the flow of solution into two or more approximately equal flows that are directed to different locations on the evaporation surface.

27. A method for separating a volatile solvent from a solution composed of the solvent and one or more non-volatile components, comprising the steps of:
   providing a thermal distillation apparatus comprising:
      one or more vertical, planar evaporation surfaces;
      one or more vertical, planar condensers, each condenser having an external surface in close proximity to, but not touching, a corresponding one of the one or more evaporation surfaces;
      spacers that prevent contact between the evaporating surfaces and the external surfaces of the corresponding condensers, a combined area of contact between the spacers and the evaporating surface being less than 50% of a total surface area of the evaporating surface and a combined area of contact between the spacers and the corresponding condenser being less than 50% of the total external surface area of the corresponding condenser;
      means for supplying a flow of the solution to the one or more condensers; and
      an insulated enclosure within which at least a portion of each evaporating surface and each condenser are located;
   feeding a flow of the solution to the one or more condensers using the means for supplying;
   externally heating the flow of solution after the solution exits the condensers;
   delivering the externally heated solution to top portions of the one or more evaporating surfaces;
   wetting the one or more evaporation surfaces with the solution so that at least some of the volatile solvent evaporates from the one or more evaporation surfaces and vapors of the solvent condense on external surfaces of the one or more condensers so as to release thermal energy that heats the flow of the solution fed to the one or more condensers, spaces between the evaporating surfaces and the condensers are filled with a gaseous mixture composed of solvent vapor and one or more non-condensable gases, the gaseous mixture has a total pressure that is approximately equal to the pressure of the ambient surrounding the thermal distillation apparatus, and except for diffusion of the solvent vapor relative to the non-condensable gases, the gaseous mixture is stationary;
   collecting the condensate produced on the external surfaces of the one or more condensers without the condensate being contaminated by the solution; and
   collecting an un-evaporated portion of the solution from the one or more evaporating surfaces.

28. The method of claim 27, wherein the thermal distillation apparatus comprises one or more vertical internal channels within each of the condensers, the solution flowing upward within the one or more internal channels, the one or more internal channels within each condenser being separated from each other by thin walls.

29. The method of claim 28, wherein the condensers are made from an extruded plastic plate of a thickness less than 5 millimeters.

* * * * *